Dec. 12, 1939.  H. B. MIDDLETON  2,182,850
ELECTRIC CONTROL MECHANISM
Filed May 15, 1936    3 Sheets-Sheet 2
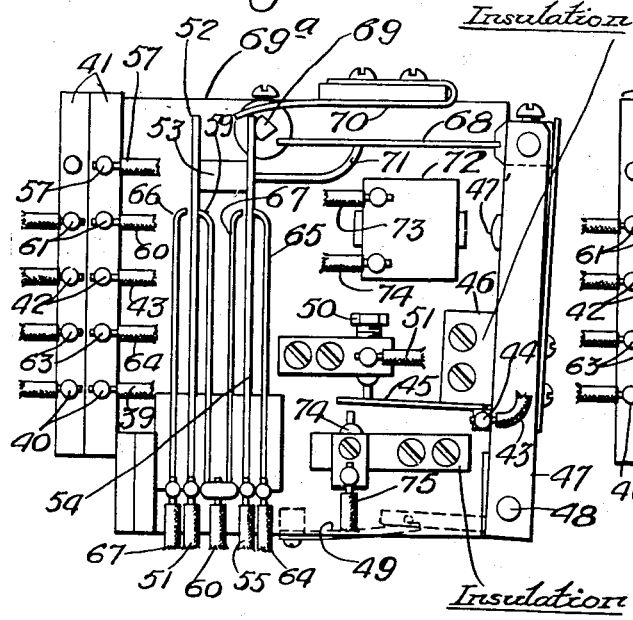
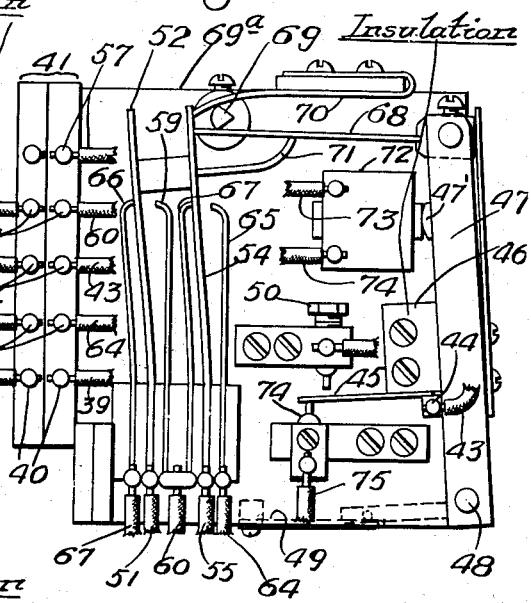
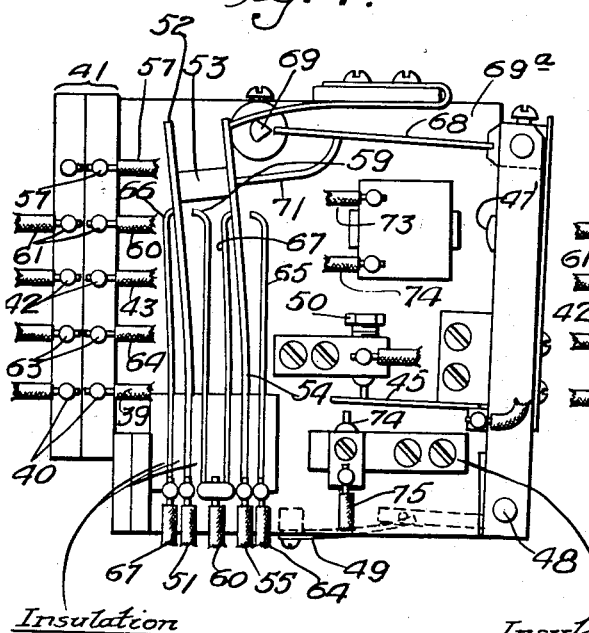
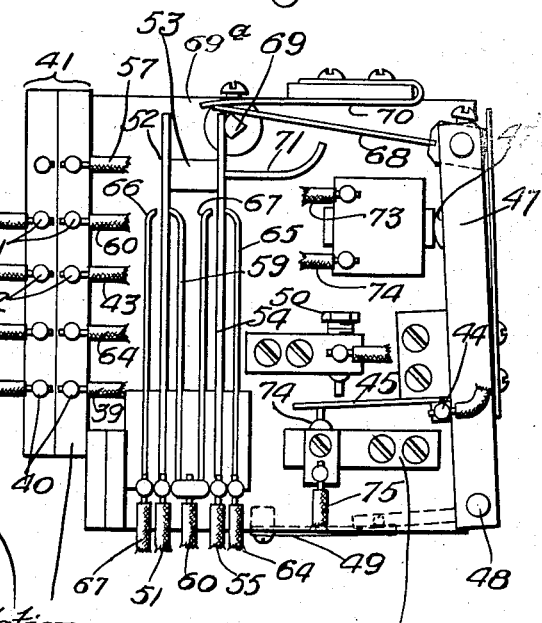
INVENTOR.
H. Bentley Middleton
BY
ATTORNEY.

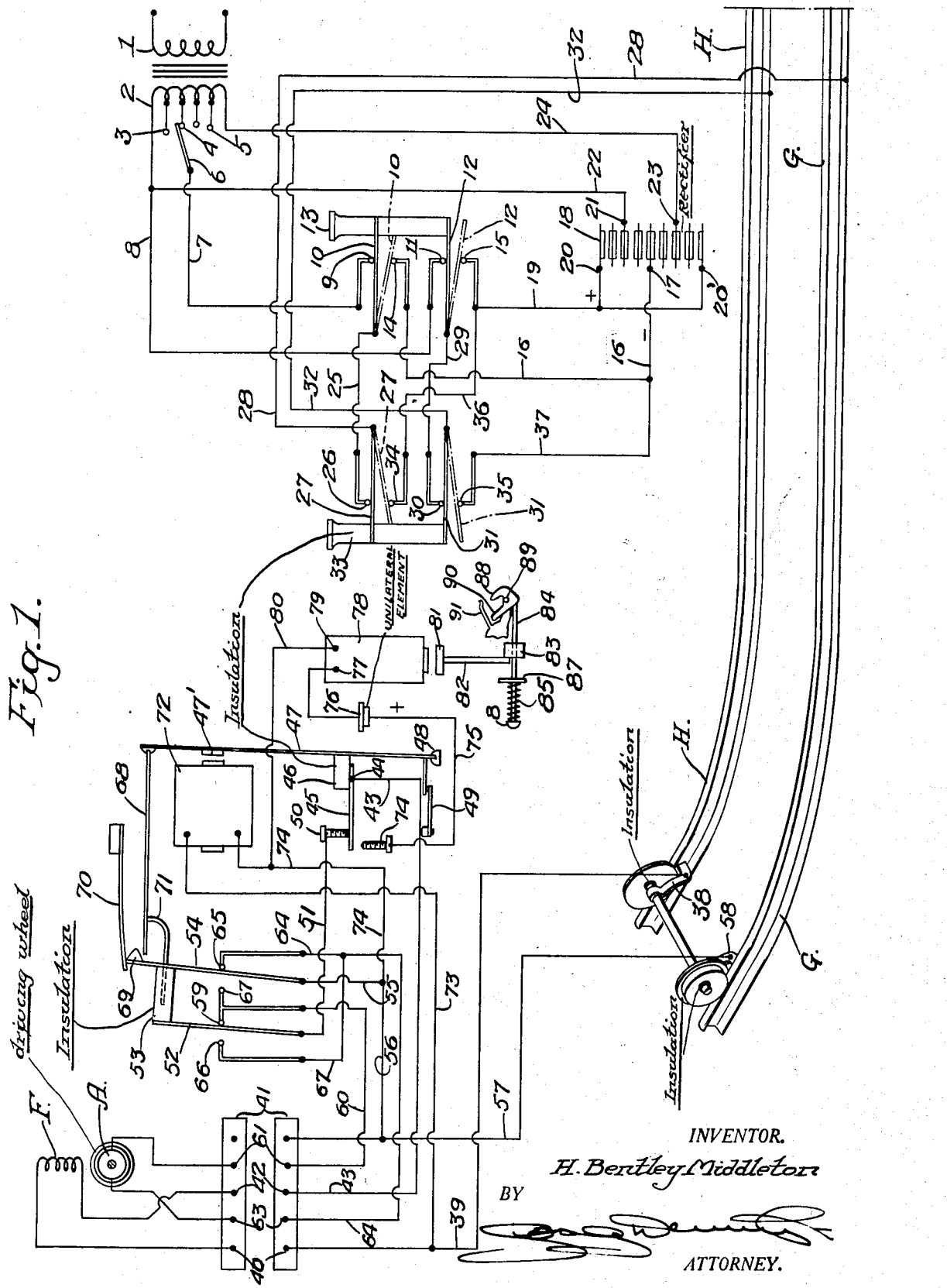

Dec. 12, 1939.    H. B. MIDDLETON    2,182,850
ELECTRIC CONTROL MECHANISM
Filed May 15, 1936    3 Sheets-Sheet 3
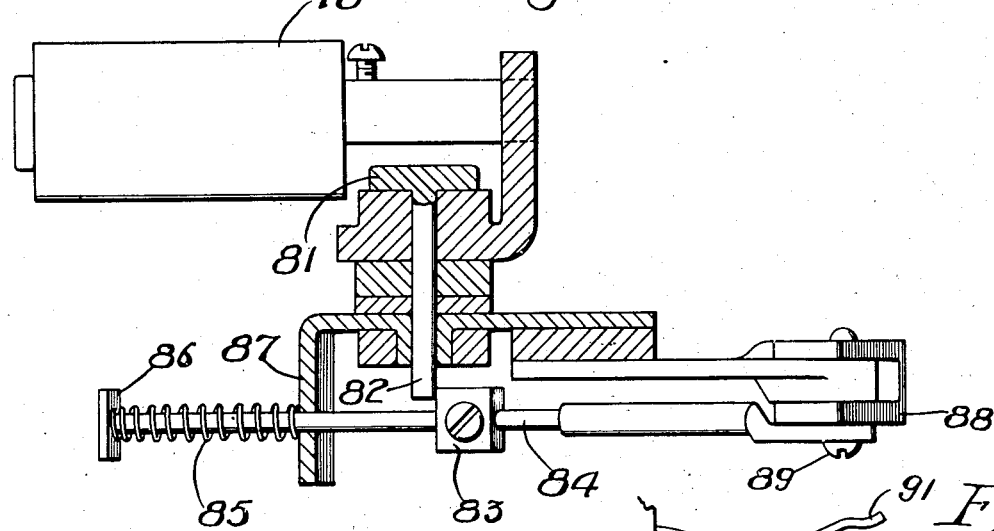
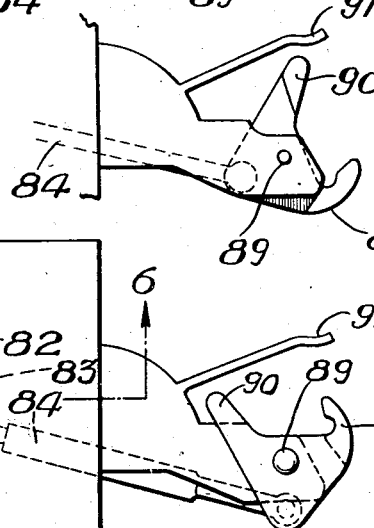
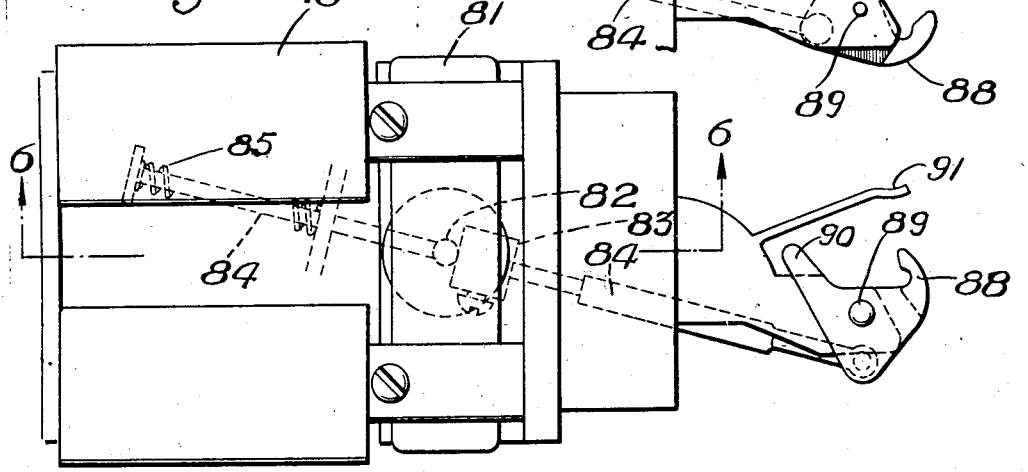
INVENTOR.
H. Bentley Middleton
BY
ATTORNEY.

UNITED STATES PATENT OFFICE 2,182,850

ELECTRIC CONTROL MECHANISM

Henry Bentley Middleton, Philadelphia, Pa.

Application May 15, 1936, Serial No. 79,949

2 Claims. (Cl. 104—150)

My invention is an electric control mechanism which is primarily designed for use in the operation of miniature electric vehicles to effect the remote control of the forward or rearward movement thereof and the operation of coupling mechanism to permit the segregation from one another of the vehicles comprised in a train. Preferably the operation of the coupler can be effected only after the motor current has been cut off and concurrently with the cutting off of the motor current there may be effected a reversal of the direction of flow of current through the motor windings when the motor circuit is reestablished after the uncoupling operation has been completed.

In the preferred embodiment of my invention there is utilized a source of alternating current and a source of direct current, such for instance as a variable voltage A. C. transformer having a rectifier in parallel therewith to supply the requisite direct current. The transformer and rectifier are connected with the rails of a miniature railway through manual switching mechanism whereby the transformer taps may be connected with the respective rails or, in alternation with the connection of alternating current, the rails may have connected therewith direct current, and the polarity of the direct current may be connected with either of the rails so that direct current of positive polarity may be connected with either the "hot" rail or the "ground" rail of the system.

The current impressed upon the rails flows therefrom through wheels or contacts of a vehicle, such as a locomotive, which is provided with a main switch having its line side normally connected with the "hot" rail of the system.

The load side of the switch is normally biased into position for connection with the supply lead of motor reversing mechanism having a plurality of blades which may be actuated by means of an electromagnet to permit the flow of current in opposite directions through the windings of a motor carried by the locomotive and operatively connected with the drivers thereof to effect the propulsion of the train. The return leads from the motor are grounded through the ground rail.

The reversing mechanism is moved alternately to its different positions by sequential energizations of the electromagnet, which acts through an armature and link to thrust a biased fulcrumed blade into position for engagement by a latch or detent on one actuation of the armature and acts to release the latch or detent upon a second actuation of the armature to permit the return of the blade to its biased position. The shifting of the link to effect its several functions is preferably caused by a rocker arm carried by the fulcrumed blade and by a tapered guide in the path of the link.

This main switch may be disconnected from the supply lead of the reversing mechanism by the above mentioned electromagnet, which is so wound as to have a high impedance preventing the passage therethrough of alternating current but which is energized by direct current supplied through the rails when the manual switching mechanism is operated to connect the rails with the rectifier or other source of direct current. Upon the actuation of the locomotive main switch by the direct current electromagnet, it is moved into position to connect with the rails of the system a conductor containing a unilateral element permitting unidirectional flow of direct current, so that when the positive polarity of the direct current is connected with the "hot" rail the current flows through such element and energizes an electromagnet having an armature controlling a coupler. When, however, the negative polarity of the direct current is connected with the "hot" rail of the system the unilateral element prevents flow through the electromagnet of the coupler.

The coupler is preferably spring-biased toward uncoupled position, but may be latched in coupled position by the armature of the coupler electromagnet when the jaw of the coupler is pressed against a complementary jaw on a second vehicle.

While my invention is particularly designed for use in the operation and control of miniature trains it is applicable to other purposes where work is to be done by electroresponsive work-performing devices or by the utilization of electromotive force at different points and in the sequence characteristic of my invention.

The characteristic features and advantages of my invention will further appear from the following description and the accompanying drawings in illustration thereof.

In the drawings, Fig. 1 is a diagrammatic view illustrating an embodiment of my invention for the operation and control of the traction motor and coupler mechanism of an electric vehicle movable along rails; Fig. 2 is an enlarged detail view showing the position of the main switch and reversing mechanism during forward movement of the locomotive; Fig. 3 is an enlarged detail view of the main switch and reversing mechanism on the first actuation of the direct current electromagnet controlling the main switch; Fig. 4 is an enlarged detail view of the main switch and reversing mechanism latched in reversing position; Fig. 5 is an enlarged detail view of the main switch and reversing mechanism on a second actuation of the direct current electromagnet illustrating the unlatching of the reversing mechanism blade; Fig. 6 is an enlarged longitudinal view sectioned along the line 6—6 of Fig. 7 showing the coupler mechanism with the jaw in coupled position; Fig. 7 is a top plan view of the coupler mechanism showing the jaw in coupled position; and Fig. 8 is a fragmentary top plan view of the outer end of the coupler with the jaw in uncoupled position.

In the particular embodiment of my invention shown in the drawings by way of illustration, there is utilized a transformer having a usual primary coil 1, and secondary coil 2 connected with taps 3, 4 and 5, adapted for coaction with a movable blade 6 to vary the voltage passing from the secondary to the conductors 7 and 8. The conductor 7 is connected with a switch contact 9 against which a spring conducting blade 10 is normally biased. The conductor 8 is connected with a switch contact 11 against which a spring conducting blade 12 is normally biased. The switch blades 10 and 12 may be operated manually by the insulated push button 13 to shift the blades out of engagement with the contacts 9 and 11 and into engagement with the switch contacts 14 and 15. The contact 14 is connected through the conductor 16 with the negative pole 17 of a rectifier column 18 and the contact 15 is connected through a conductor 19 with the positive poles 20 and 20' of the rectifier column 18.

The rectifier 18 may be any suitable type of rectifier but is preferably composed of a stack of copper oxide discs or washers through which current can pass from the copper oxide faces to the copper faces but not in the reverse direction. The discs may be spaced by soft metal washers to improve the contact and sleeved on an insulating rod to maintain alignment. An intermediate disc 21 is connected by the conductor 22 with one end of the secondary coil 2 and an intermediate disc 23 is connected by a conductor 24 with the opposite end of the secondary coil 2.

The blade 10 is permanently connected through a conductor 25 with the switch contact 26 against which is normally biased a spring conducting blade 27 which is connected through a conductor 28 with the "hot" rail H of a miniature railway.

The conducting blade 11 is permanently connected through a conductor 29 with a switch contact 30 against which is normally biased a spring conducting blade 31 which is permanently connected through the conductor 32 with the ground rail G of the miniature railway system. The blades 27 and 31 may be manually shifted by an insulating push button 33 out of engagement with the switch contacts 26 and 30 and into engagement respectively with the switch contacts 34 and 35. The contact 34 is connected through the conductors 36 and 19 with the positive terminals 20 and 20' of the rectifier 18 and the switch contact 35 is connected through the conductors 37 and 16 with the negative terminal 17 of the rectifier 18.

Current impressed on the rail H flows therefrom through a suitable contact such as the shoe 38 of a tractor vehicle, such as a miniature locomotive, and through a conductor 39 to the motor field terminal 40 on the block 41. The other field terminal 42 is connected through a conductor 43 with the line terminal 44 of a conducting switch blade 45 fixed to an insulating block 46 mounted on the lever 47, which is fulcrumed on a bearing 48 and normally biased toward the right (Fig. 1) by a leaf spring 49. The blade 45 is normally biased into engagement with a contact screw 50 which is connected by a conductor 51 with the end of a spring conducting blade 52 which is mechanically connected through the insulating block 53 with a spring conducting blade 54, which is connected through the conductors 55, 56 and 57 and movable contact, such as the shoe 50, with the ground rail G. The rails H and G and the shoes or contacts moving along the same are otherwise insulated from one another.

The blade 52 is normally biased into engagement with the contact 59, which is connected by a conductor 60 with the terminal 61 of the motor armature 62 and the other terminal 63 of the armature is connected through a conductor 64 with the contact 65, against which the blade 54 is normally biased (Figs. 1 and 2).

The blades 52 and 54 may be shifted toward the left, out of engagement with the contacts 59 and 65 and into engagement with the contacts 66 and 67 (Fig. 3). The contact 66 is connected through the conductors 67 and 64 with the armature terminal 63 and the contact 67 is connected through the conductor 60 with the armature terminal 61.

The shifting of the blades 52 and 54 toward the left is effected by the rocking of the lever 47, which moves the rod 68 to initially engage the blade 54 immediately below the triangle or wedge-shaped guide 69 mounted on the base 69a (Fig. 3). When the blade 54 is shifted to the left it is latched in such position by a spring latch 70, the end of which engages the blade 54 immediately above the guide 69. The rocking of the blade 54 rocks upward the curved arm 71 thereon which imparts a stress to the spring blade 68 tending to deflect its free end upward above the apex of the guide 69 when the rod 68 is retracted to its normal biased position, as shown in Fig. 4. On the next leftward movement of the rod 68 by the rocking of the lever 47, the end of the rod 68 is deflected upwardly by the upper inclined surface of the cam or guide 69 and thereby lifts the latch 70 out of engagement with the blade 54 and permits the blades 52 and 54 to return to their normal biased position in engagement with the contacts 59 and 65.

The rocking of the lever 47 is effected by the energizing and de-energizing of the electromagnet 72 whose coil is so wound that its impedance is too high to permit the passage therethrough of alternating current but does permit the passage therethrough of direct current which is supplied from the conductor 73 tapped on to the conductor 39 and through the conductor 74 tapped on to the conductor 56.

When the lever 47 is rocked, it first disengages the main switch blade 45 from the contact screw 50, thus opening the motor circuit and preventing any movement of the locomotive due to D. C. entering the motor. The opening of the switch also prevents the motor acting as a shunt to the operating magnet 72. Otherwise, the motor being of much lower resistance than the magnet 72, it would take the greater part of the operating current and might interfere with the complete operation of the lever 47. The opening of the circuit through the members, before any of the reversing switch blades are moved, breaks the motor circuit at this point and hence any arcing or burning due to the opening of the circuit occurs at these contacts and not at the reversing switch blades, so that the reversing blades may be made of much lighter construction. Any wear of the contacts 45—50 is compensated for by the arm 47 moving further toward the right, and considerable wear can be thus taken care of, before adjustment of the screw 50 is necessary.

On the completion of the movement of the lever 47, the blade 45 engages with the contact 74 which is connected through a conductor 75 with a unilateral element 76 preferably consisting of one or more copper oxide discs with their oxide faces connected with the conductor 75 so that positive polarity direct current may flow unidirectional through the conductor 75 and element 76 to the one terminal 77 of the coil of the electromagnet 78 whose other terminal 79 is connected through a conductor 80 with the conductor 74.

An armature 81 in the field of the electromagnet 78 has connected therewith a latch or detent 82 adapted to engage a collar 83 on the shaft 84 when the electromagnet 76 is de-energized. When the electromagnet 78 is energized by the passage of current therethrough, it attracts the armature 78 and draws the detent 82 out of the path of the collar 83. The rod 84 is normally biased toward the left (Figs. 1, 6 and 7) by a coiled spring 85 disposed between the head 86 and the bracket 87. The other end of the rod 84 is pivotally connected with a coupler jaw 88 adapted to be rocked on a pivot 89 for engagement with a complementary similar jaw when the arms 90 of the complementary jaws are abutted together. A guard and guide 91 serve to direct the complementary arms 90 toward one another to effect the engagement of the complementary coupler jaw 88. The engagement of the coupler jaws draws the rod 84 forwardly against the biasing action of the spring 85 and latches the collar 83 in front of the detent 82, when the detent is in its lower position. When, however, the detent is elevated by the attraction of the armature 81 by the electromagnet 78, the biasing action of the spring 85 thrusts the rod 84 toward the left (Fig. 8) and uncouples the complementary jaws.

During the normal operation of the train in the forward direction the push buttons 13 and 33 are in their upper positions and alternating current flows from the coil 2 through the members 7, 9, 10, 25, 26, 27, 28, G, 58, 57, 56, 55, 54, 65, 64, 63, A, 61, 60, 59, 52, 51, 50, 45, 44, 43, 42, F, 40, 39, 38, H, 32, 31, 30 29, 12, 11 and 8 back to coil, thereby rotating the rotor of a motor to move the train in the forward direction. No current flows through the stack 18 because all the switch blades are disengaged from the contacts connected with the stack. No current flows through the conductors 73 and 74 because the inductance of the coil of the electromagnet 72 is too high to permit the passage of alternating current therethrough.

If now it is desired to reverse the direction of movement of the train, without uncoupling, the push button 33 is depressed to disengage the blades 27 and 31 from the contacts 26 and 30 and momentarily engage the blades 27 and 31 with the contacts 34 and 35. This momentarily interrupts the flow of alternating current but soon permits the flow of alternating current through the conductors 22 and 23 to the stack 18 where it is rectified by the discs of such stack 18, with a consequent flow of direct current from the positive terminals 20 and 20' through the parts 19, 36, 34, 27, 28, G, 58, 57, 56, 74, 72, 73, 39, 38, H, 32, 31, 35, 37, 16, and back to the negative terminal 17 of the stack 18. This flow energizes the electromagnet 72, which attracts the armature 47' on the lever 47, moves the blades 52 and 54 into engagement with the contacts 66 and 67, and latches them in this position as shown in Fig. 3. The rocking of the lever 47 momentarily disengages the blade 45 from the screw 50 and engages it with the screw 74, but there is no flow of direct current through the electromagnet 78 because the positive polarity would tend to flow from the conductor 74 through the members 80, 79, 78, and 77, but is stopped by the copper surface of the unilateral element 76 and prevented thereby from flowing through the conductor 75, screw 74, blade 45, and parts 43, 42, F, 40, 39, 38, and back to the rail H.

When the button 33 is released, the circuit through the electromagnet 72 is broken, but the blades 52 and 54 are retained latched in their leftward position shown in Fig. 3. Hence alternating current now flows through the panel board and to the main blade 45 in the manner previously described, but from the main blade flows through the reversing blade 52, contact 66, contact 67, conductor 64, armature terminal 63, armature A, armature terminal 61, conductor 60, terminal 67, blade 54, conductors 55, 56 and 57, and back to ground through the rail G and the panel board in the manner previously described.

Since, however, the current is now passing through the motor windings from terminal 63 to terminal 61 the motor will rotate in the reverse direction from that in which it moves when current is flowing through the motor windings from terminal 61 to terminal 63.

The backward movement of the locomotive will bring the coupler arm 89 into engagement with the complementary coupler arm of another car and throw the jaw 88 to coupling position, where it is locked by the engagement of the detent 82 behind the collar 83.

A further actuation of the button 33 will again energize the electromagnet 72 and rock the lever 47 to cause the rod 68 to disengage the latch 70 and permit restoration of the blades 52 and 54 to their initial position, with consequent forward rotation of the motor.

To temporarily cut off the supply of alternating current to the motor and to release the coupler, with incidental operation of the reversing mechanism, the plunger 13 is momentarily depressed. This disengages the blades 10 and 12 from the contacts 9 and 11 to interrupt the alternating current and engage these blades with the contacts 14 and 15. Current now flows from the coil 2, through the conductors 22 and 23, is rectified by the copper oxide discs at the ends of the stack 18, and flows as direct current from the positive terminals 20, 20' through the parts 19, 15, 12, 29, 30, 31, 32, rail H, 38, 39. The current then divides, a portion thereof going through the parts 73, 72, 74, 56, 57, 58, rail G, 28, 27, 26, 25, 10, 14, 16, back to the negative terminal 17. The current thus flowing through and energizing the electromagnet 72 causes it to attract the armature 47' and rock the lever 47 to effect the shift of the reversing blades 52, 54, and move the main switch blade away from the contact screw 45 into engagement with the contact screw 74. This establishes a shunt current for direct current of positive polarity from the conductor 39 through the terminals 40, field F, terminals 42, conductor 43, blade 45, parts 74, 75, 76, 77, 78, 79 and 80 to conductor 74, where the shunt flow rejoins the main flow and returns therewith to the negative terminal 17 as described. The electromagnet 78 is thereby energized to attract the armature 81 and release the detent 82 from the collar 83, on which the detent then rides. The expansion of the spring 85 then throws the coupler rod 84 and jaw 88 to uncoupling position.

The release of the button 13 reestablishes the alternating current circuit through the motor, and if a change in its direction of rotation is desired this can be effected by pushing either button 13 or 33. It will be noted that the initial movements of the buttons 13 or 33 breaks the alternating current circuit before the direct current circuit is established and prevents any direct current impulse going back into the transformer through the conductors 7 and 8.

While I prefer to use both traction rails as conductors, a third rail may, if desired, be added as a separate traction rail, and the direct current may be supplied from a battery instead of a rectifier if desired. Any desired number of coupling mechanisms may be connected in parallel in the circuit controlled by the unilateral element 76. This element provides a simple, efficient and inexpensive means for operation of the reversing mechanism by the button 33 without operating the couplers or permitting the operation of the couplers by the button 13 without wastage of direct current by flow through the armature windings or damage thereto. The controls may be assembled in convenient panels or units comprising the transformer, rectifier and manual switching mechanism assembled together at a point a suitable distance from the track, and the propelling motor, main control switch, and its electromagnet, reverving mechanism, unilateral conductor, coupler actuator and coupler, may be assembled in a suitable vehicle, such as a miniature locomotive, trolley car, tractor, or the like.

Having described my invention, I claim:

1. The combination with a traction wheel and an electric motor therefor and a coupler and an electric actuator therefor, of operating and control mechanism including as elements a source of alternating current, a source of direct current, an electromagnet energizable by direct current only, a switch operable by said electromagnet for putting said motor in circuit with said alternating current source or said actuator in circuit with said direct current source, a circuit between said switch and motor including motor reversing mechanism operable by said electromagnet, a circuit between said switch and actuator including a unilateral conductor permitting unidirectional current flow, and means connecting said elements in circuit and including switching mechanism for connecting one side of said switch alternately in circuit with the alternating current source and with the positive polarity of the direct current source or for connecting said side of said switch alternately with the alternating current source and with the negative polarity of the direct current source.

2. The combination of a transformer, a rectifier connected with said transformer, a switch, mechanism for connecting one side of said switch alternately with the transformer and with the rectifier, said mechanism including means for connecting said one side of the switch with either the positive polarity or the negative polarity of the rectifier, an electromagnet connected with said rectifier through said mechanism whenever said one side of said switch is connected with said rectifier, electromagnetic coupler mechanism, a unilateral conductor permitting unidirectional current flow between said switch and coupler mechanism in one position of said switch, motor reversing mechanism operable by said electromagnet and connected with said switch in a second position thereof, and a traction motor connected with said reversing mechanism, and operable by current from said transformer.

H. BENTLEY MIDDLETON.